(12) United States Patent
Cunningham et al.

(10) Patent No.: US 11,947,963 B2
(45) Date of Patent: Apr. 2, 2024

(54) COMPUTING RESOURCE MANAGEMENT WITH FAST SORTING USING VECTOR INSTRUCTIONS

(71) Applicant: Microsoft Technology Licensing, LLC, Redmond, WA (US)

(72) Inventors: Conor John Cunningham, Austin, TX (US); Thierry Fevrier, Gold River, CA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 12 days.

(21) Appl. No.: 17/712,879

(22) Filed: Apr. 4, 2022

(65) Prior Publication Data
US 2023/0315449 A1    Oct. 5, 2023

(51) Int. Cl.
*G06F 9/30*   (2018.01)
*G06F 7/08*   (2006.01)
*G06F 9/38*   (2018.01)

(52) U.S. Cl.
CPC ............ *G06F 9/30036* (2013.01); *G06F 7/08* (2013.01); *G06F 9/3836* (2013.01)

(58) Field of Classification Search
CPC .............................. G06F 9/30036; G06F 7/08
See application file for complete search history.

(56) References Cited

U.S. PATENT DOCUMENTS

2020/0372098 A1*  11/2020  Anderson ............. G06F 9/3009

OTHER PUBLICATIONS

"Bitonic Sort", Retrieved From: https://www.inf.hs-flensburg.de/lang/algorithmen/sortieren/bitonic/bitonicen.htm, Jun. 4, 2018, 5 Pages.
"Bitonic Sorter", Retrieved From: https://en.wikipedia.org/wiki/Bitonic_sorter, Dec. 22, 2021, 3 Pages.
"Hoare's vs Lomuto Partition Scheme in QuickSort", Retrieved From: https://www.geeksforgeeks.org/hoares-vs-lomuto-partition-scheme-quicksort/, Feb. 8, 2022, 22 Pages.

(Continued)

*Primary Examiner* — Michael J Metzger
(74) *Attorney, Agent, or Firm* — Barta Jones, PLLC

(57) ABSTRACT

Computing resource management is improved during fast sorting using vector instructions. The process includes: determining a pivot value and a pivot position in a data set (e.g., by sampling with vectors and determining the sample median), determining whether moving data in the sampled portion may be avoided (e.g., if it is constant-valued or already sorted) and, leveraging that determination to possibly avoid unnecessary data movement, sorting the data set. Some examples further determine the microarchitecture version of the computing device performing the sorting and select an implementation of sorting instruction that is tuned for that microarchitecture version (e.g., based on the number of vector registers and motherboard cache configuration). Some examples leverage a soft 3-way quicksort by finding data elements adjacent to the pivot position that also have the pivot value and adding a partition boundary at the end of the set of same-valued data elements.

20 Claims, 9 Drawing Sheets

(56) References Cited

OTHER PUBLICATIONS

"Intel® Intrinsics Guide", Retrieved From: https://www.intel.com/content/www/us/en/docs/intrinsics-guide/index.html#=undefined, Dec. 6, 2021, 134 Pages.
"Introsort", Retrieved From: https://en.wikipedia.org/wiki/Introsort, Dec. 9, 2021, 3 Pages.
"Quicksort", Retrieved From: https://en.wikipedia.org/wiki/Quicksort#Hoare_partition_scheme, Feb. 13, 2022, 18 Pages.
"Intrinsics for Intel® Advanced Vector Extensions 512 (Intel® AVX-512) Instructions", Retrieved from: https://www.intel.com/content/www/us/en/develop/documentation/cpp-compiler-developer-guide-and-reference/top/compiler-reference/intrinsics/intrinsics-for-avx-512-instructions.html, Dec. 6, 2021, 4 Pages.
"Sorting Algorithm", Retrieved From: https://en.wikipedia.org/wiki/Sorting_algorithm, Jun. 30, 2022, 16 Pages.
"Timsort", Retrieved From: https://en.wikipedia.org/wiki/Timsort, Feb. 6, 2022, 6 Pages.
"Windows 10 SDK", Retrieved From: https://web.archive.org/web/20210105110208/https://developer.microsoft.com/en-us/windows/downloads/windows-10-sdk/, Jan. 5, 2021, 6 Pages.
Bramas, Bérenger, "A Fast Vectorized Sorting Implementation based on the ARM Scalable Vector Extension (SVE)", In Journal of PeerJ Computer Science, Nov. 19, 2021, 24 Pages.
Bramas, Berenger, "A Novel Hybrid Quicksort Algorithm Vectorized using AVX-512 on Intel Skylake", In International Journal of Advanced Computer Science and Applications, vol. 8, Issue 10, Nov. 2017, pp. 337-344.
Bramas, Berenger, "Fast Sorting Algorithms using AVX-512 on Intel Knights Landing", In Repository of arXiv:1704.08579v1, Apr. 24, 2017, pp. 1-16.
Edelkamp, et al., "BlockQuicksort: How Branch Mispredictions don't Affect Quicksort", In Repository of arXiv:1604.06697v2, Jun. 23, 2016, pp. 1-23.
Yaroslavskiy, Vladimir, "Dual-Pivot Quicksort", Retrieved From: https://web.archive.org/web/20151002230717/http:/jaroslavski.narod.ru/quicksort/DualPivotQuicksort.pdf, Sep. 22, 2009, pp. 1-11.
Kristo, et al., "The Case for a Learned Sorting Algorithm", In Proceedings of the 27th ACM Symposium on Operating Systems Principles, Oct. 27, 2019, 3 Pages.
Mikben, et al., "Large-Page Support", Retrieved From: https://docs.microsoft.com/en-us/windows/win32/memory/large-page-support, Jan. 8, 2021, 2 Pages.
Xiaochen, et al., "Register Level Sort Algorithm on Multi-Core SIMD Processors", In Proceedings of the 3rd Workshop on Irregular Applications: Architectures and Algorithms, Nov. 17, 2013, 8 Pages.
"Sorting and Searching: The Art of Computer Programming," vol. 3. Donald E. Knuth, 1973, p. 232-233.
Bramas, Berenger, "A Fast Vectorized Sorting Implementation Based on the ARM Scalable Vector Extension (SVE)", In Repository of: arXiv:2105.07782v1, May 17, 2021, 23 Pages.
Liszka, et al., "A Generalized Bitonic Sorting Network", In Proceedings of Parallel Processing International Conference, Aug. 16, 1993, pp. 105-108.
"International Search Report and Written Opinion Issued in PCT Application No. PCT/US23/011375", dated May 8, 2023, 12 Pages.

* cited by examiner

Excluded from determination of median

US 11,947,963 B2

COMPUTING RESOURCE MANAGEMENT WITH FAST SORTING USING VECTOR INSTRUCTIONS

BACKGROUND

Sorting of data in stored computer files has historically included algorithms such as bubble sort, radix sort, insertion sort, merge sort, and quicksort. For large terabyte-scale and petabyte-scale data sets, as is common in current cloud computing environments, historical sorting algorithms are slow. For example, the C standard library implementation of a quicksort algorithm, sort( ), may run in O(N log N) time, where N is the number of items to be sorted, but in some cases may degrade to $O(N^2)$. When N is large, the runtimes become unacceptably slow.

Bitonic sorting provides the promise of improved runtimes. A bitonic sequence is one that is monotonically non-decreasing (e.g., ascending) until some point and then monotonically non-increasing (e.g., descending) from that point until the end. However, basic bitonic sorting implementations, although generally faster than prior-generation sorting, have no acceleration features. This means that, when data is already partially-sorted (as may be the case in real-world large data sets), much of the sorting operations are superfluous and waste computing resources (and therefore time) on data that does not require further sorting.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Examples of fast sorting using vector instructions include: sampling, by a processor, a data set with a sampling vector set, the sampling vector set comprising at least one vector, each vector comprising a plurality of data elements of the data set; determining, using a vector instruction executed by the processor, a median value of the data elements in the sampling vector set; determining, using the processor, that multiple data elements in the sampling vector set have a same value as the median value or are already sorted; identifying that at least a portion of the data set is to be excluded from at least a portion of sorting operations; and sorting, using the processor, the data set using the median value as a pivot value, wherein the sorting excludes, from the at least a portion of sorting operations, the at least a portion of the data set identified as to be excluded.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
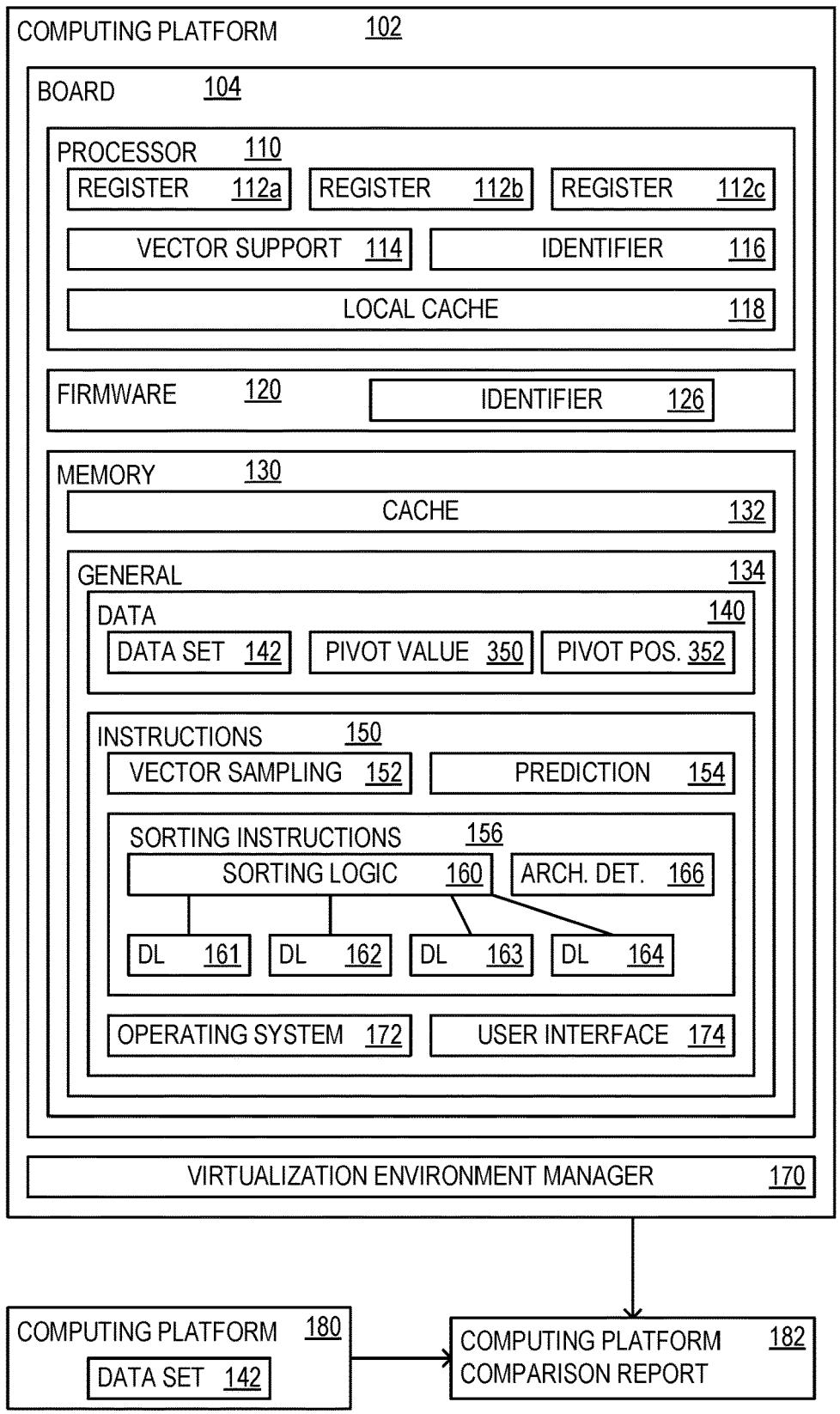
FIG. 1 illustrates an example arrangement that advantageously provides fast sorting using vector instructions.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Examples of fast sorting using a pivot value (e.g., "quicksort") and vector instructions include: determining a pivot value and a pivot position in a data set (e.g., by sampling with vectors and determining the sample median), determining whether moving data in the sampled portion may be avoided (e.g., if it is constant-valued or already sorted) and, leveraging that determination to possibly avoid unnecessary data movement, sorting the data set. Some examples use Advanced Vector Extension (AVX) 512 vector instructions (the third generation of AVX, after AVX1 and AVX2), and some examples further determine the microarchitecture version of the computing device performing the sorting and select an implementation of sorting instruction that is optimized or otherwise tuned for that microarchitecture version (e.g., based on the number of vector registers and motherboard cache configuration). Some examples leverage a soft 3-way quicksort by finding data elements adjacent to the pivot position also have the pivot value and adding a partition boundary at the end of the set of same-valued data elements.

As described herein, sorting moves data into and out of memory locations in a computer storage medium, based on the values of the data, to place the data into an ascending or descending sequence.

Aspects of the disclosure provide a practical result of reducing memory bandwidth and reducing the quantity of central processing unit (CPU) operations required for sorting, thereby improving the speed of computing devices such as vector-enabled cloud resources sorting large data sets stored in databases. This is accomplished at least by identifying that at least a portion of a data set being sorted is to be excluded from at least a portion of sorting operations that include time-consuming write operations. The sorting then excludes any portion of the data set identified as to be excluded, providing reduced memory bandwidth and reduced runtimes. The $O(N^2)$ runtimes, where N is the number of items to be sorted, may thus be avoided for data sets that result in slow runtimes for current sorting algorithms. For example, the soft 3-way quicksort precludes some scenarios that may lead to $O(N^2)$ runtimes.

Vector instructions are able to operate on multiple data elements simultaneously with a single operation, and thus are able to perform compute functions more rapidly when multiple data elements are all subject to a common process (e.g., sorting, moving, and certain mathematical operations). Recent generations of CPUs have added vector instructions to speed up compute operations, with generally increasing power and capability. For example, vector instructions have been introduced in instruction sets called AVX1, AVX2, and AVX-512. These have generally doubled generation-over-generation vector width, increasing the power of vectorized algorithms with each generation.

Bitonic sorting is a parallel sorting model that leverages operations happening concurrently, that is $O(N \log^2 N)$ in terms of the number of comparisons but $O(N \log N)$ in terms of runtime. As disclosed herein, bitonic sorting may be implemented to leverage vector instructions and vector registers. Aspects of partitioning that are described in further detail below, such as partitioning using a pivot value, may be efficiently handled using vector instructions. For example, when using AVX-512 vector instructions for partitioning, multiple data elements may be compared simultaneously (e.g., with a single instruction) with a pivot value, and a subset of the elements may be efficiently moved (as a result of the comparison) to the smaller or larger side of the partition using masked vector move instructions. For 64-bit data elements, this effectively performs 8 comparisons per clock cycle, rather than only a single comparison. Note that 64 bits/element×8 elements=512 bits, which is the size of the vector.

Modern CPUs also use branch prediction, which attempts to predict the next address to fetch, and may also speculatively fetch cache lines from memory subsystems, parse them into instructions and decode into micro-instructions, which operate over multiple clock steps. The CPUs are then able to begin executing an instruction even before the branch output is known. This saves compute time when the prediction is correct, but forces a CPU stall to perform a correction, when the prediction is incorrect.

Avoiding branching instructions reduces the number of incorrect predictions, and may thus improve overall performance (e.g., reduce runtime of the sorting, use fewer I/O requests to memory). Some instructions in a CPU architecture (e.g., COMO* in x86) are conditional instructions that do not change the possible next instruction to be executed, and therefore avoid possible incorrect branching predictions.

In general, attention to how source code compiles into machine language instructions (which may be more readily understood by humans when displayed as assembly language) may provide significant performance improvements. This is because issues introduced by modern CPUs, such as cache hierarchy behaviors, branch prediction behaviors, and others, may also introduce performance degradation, if not addressed proactively, and handled correctly. As a result, there is a gap between the academic publishing process and the creation of a complete, generalized sort implementation that is suitable for commercial and production environments.

Examples of the disclosure include a vectorized sampling algorithm to select a pivot value, and/or a prediction layer to efficiently detect and avoid certain patterns which result in extended runtimes (e.g., $O(N^2)$ performance) that may occur with some algorithms with certain data distributions. Some examples include a soft form of a 3-way quicksort which further helps avoid degenerate $O(N^2)$ performance cases, which may occur with certain commonly-occurring data distributions. Examples include a bitonic sort tuned to maximize performance on specific microarchitecture versions, and some examples include logic to prevent stack overflow by tuning the use of the stack of next sections to partition intelligently.

Some examples deploy with an implementation that is specific to certain microarchitectures and operating systems (OS). For example, a platform-specific implementation, or a plurality of implementations plus logic, determine the platform and select the proper implementation from the plurality. A platform-specific implementation improves sorting performance on large data sizes including prefetching, leveraging large OS pages to avoid translation lookaside buffer (TLB) lookup costs, and other optimizations which manifest on larger data sizes (e.g., more than a billion elements).

A TLB is a memory cache that is used to reduce the time taken to access a user memory location. A page is a fixed-length contiguous block of virtual memory, described by a single entry in a page table, and is the smallest unit of data for memory management in a virtual memory OS. A transfer of pages between main memory and an auxiliary store, such as a hard disk drive, is referred to as paging or swapping. Reducing paging will speed up performance. A platform-specific implementation may be deployed as a compiled dynamic library that is tuned to a specific microarchitecture version (e.g., CPU, firmware, memory cache configuration, OS, etc.).

FIG. 1 illustrates an example arrangement 100 that advantageously provides fast sorting using vector instructions in a manner suitable for a commercial product (e.g., with user-friendly runtimes and robustness (e.g., crash resistance)). In some examples, arrangement 100 is implemented using one or more examples of computing device 900 of FIG. 9. In arrangement 100, a computing platform 102 sorts a data set 142, which may be a database. Real-world data ranges from being effectively random ranges to having strong patterns and/or repeating values, and sections with constant values or that are already sorted. The disclosure accounts for conditions of real-world data.

Computing platform 102 may be a single computing device 900, or a virtual environment implemented on one or more computing devices 900, and managed by a virtual environment manager 170 (e.g., including a hypervisor). A practical application of arrangement 100 is to use the disclosure for benchmarking and validating new CPU designs and cache memory configurations. For example, as described below, some CPUs implement a thermal defense of slowing down the clock to reduce heat generation. This may be triggered by heavy use of vector instructions. Thus, the vector operations may hinder performance, based on the vector support implementation.

Figure 5:
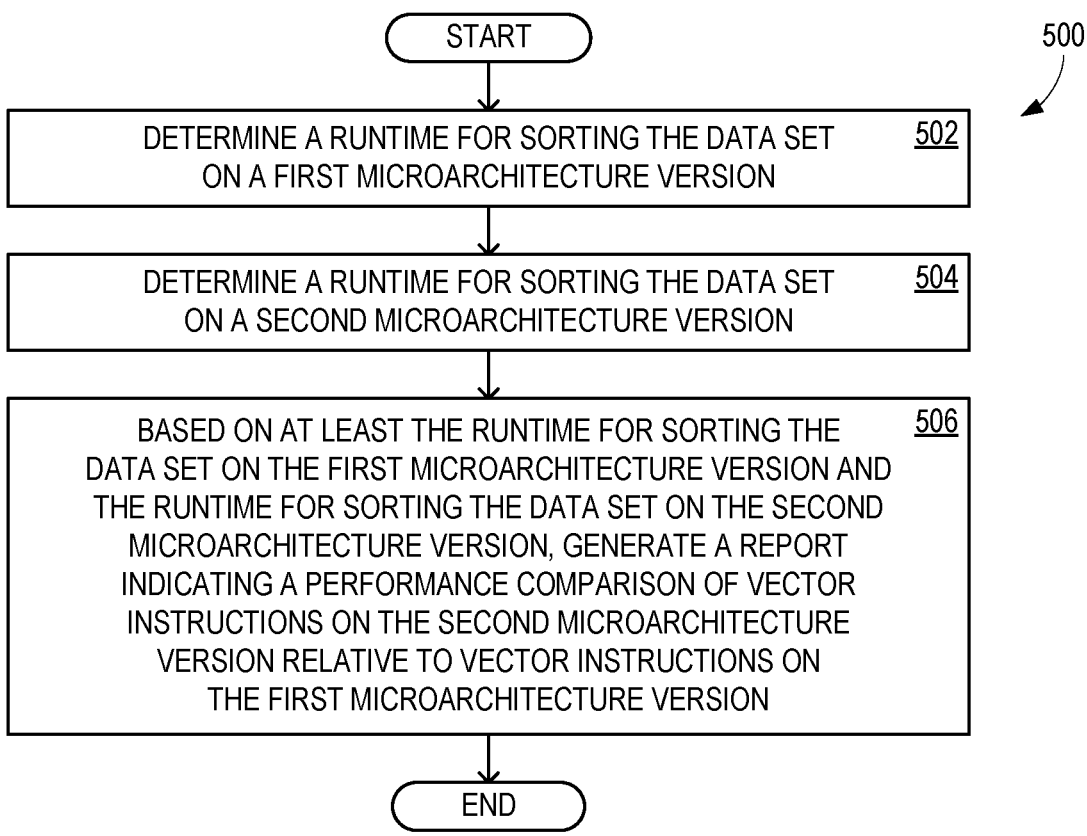
FIG. 5 shows a flowchart illustrating an exemplary practical application of the arrangement of FIG. 1.

This is described further in relation to FIG. 5, in which both computing platform 102, representing a known good microarchitecture, and computing platform 180, representing a microarchitecture under test, both sort data set 142. The runtimes may be compared and reported in a computing platform comparison report 182. This may be used to identify whether computing platform 180 is an improvement relative to computing platform 102.

Computing platform 102 (or if computing platform 102 is virtual, then a supporting computing device 900) has a motherboard 104 that hosts one or more processors 110, firmware 120, and memory 130. Processor 110 may be a CPU, and supports vector instructions with a vector register 112a, vector register 112b, vector register 112c, and vector support 114. Vector support 114 enables processor 110 to implement vector instructions, such as AVX-512 vector instructions or another set of single instruction multiple data (SIMD) instructions, and to leverage vector registers 112a-

112c. Although three vector registers are illustrated, it should be understood that other numbers of registers, such as 32, may be used. As indicated below, different versions of processor 110 may use different numbers of registers. In some examples, even if the instruction set, implemented using vector support 114, supports 32 logical registers, register aliasing may internally map this to fewer physical registers.

A processor identifier 116 identifies a specific version of processor 110, which enable identification of whether processor 110 supports AVX-512 vector instructions or another set, or has 32 physical registers or a different number. Processor 110 may also have an on-board local cache 118, which enables rapid retrieval of data elements without having to bring them into processor 110 from an external source, such as memory 130. Processor identifier 116 also enables determination of the configuration of local cache 118 (e.g., size of local cache 118).

Memory 130 may have a limited-size fast section as cache 132 and a general (e.g., heap) memory 134 that will generally be slower than cache 132, but can store large amounts of data. A firmware identifier 126 may be leveraged to identify the configuration of motherboard 104, including the configuration of cache 132. Processor identifier 116 and/or firmware identifier 126 may be leveraged to enable determination of the microarchitecture version of computing device 900 that is executing the sorting.

Memory 130 holds data 140 and instructions 150 that support the sorting disclosed herein. Data 140 includes data set 142, a pivot value 350, and a pivot position 352 (e.g., an index position of a data element having pivot value 350). The significance of a pivot value and a pivot position is described herein.

In addition to an OS 172 and a user interface 174 (which permits a user to operate computing platform 102), instructions 150 include vector sampling 152, a prediction layer 154, and sorting instructions 156. Vector sampling 152 is used to estimate a median of data set 142, as described in further detail in relation to FIG. 3, to use as pivot value 350. Prediction layer 154 determines whether moving data in a certain section of data set 142 is necessary. For example, if a portion of data set 142 is already sufficiently sorted, the sorting may skip that portion and move to the next portion. This saves time over blindly sorting the entirety of data set 142.

Sorting instructions 156 leverage an architecture determination 166 that reads processor identifier 116 and/or firmware identifier 126, and may also identify OS 172, to determine the microarchitecture version of computing device 900. Sorting logic 160 may be a vectorized sorting algorithm that, in some examples, provides a layer of abstraction for architecture-specific dynamic library implementations. For example, sorting instructions 156 include a plurality of dynamic library implementations of sorting instructions, illustrated as dynamic library 161, dynamic library 162, dynamic library 163, and dynamic library 164. It should be understood that, in some examples, a different number of dynamic libraries may be used. In some examples, a general implementation may be used, if the microarchitecture version is not recognized by architecture determination 166. In some examples, sorting logic 160 implements a vectorized version of bitonic sorting.

Figure 2:
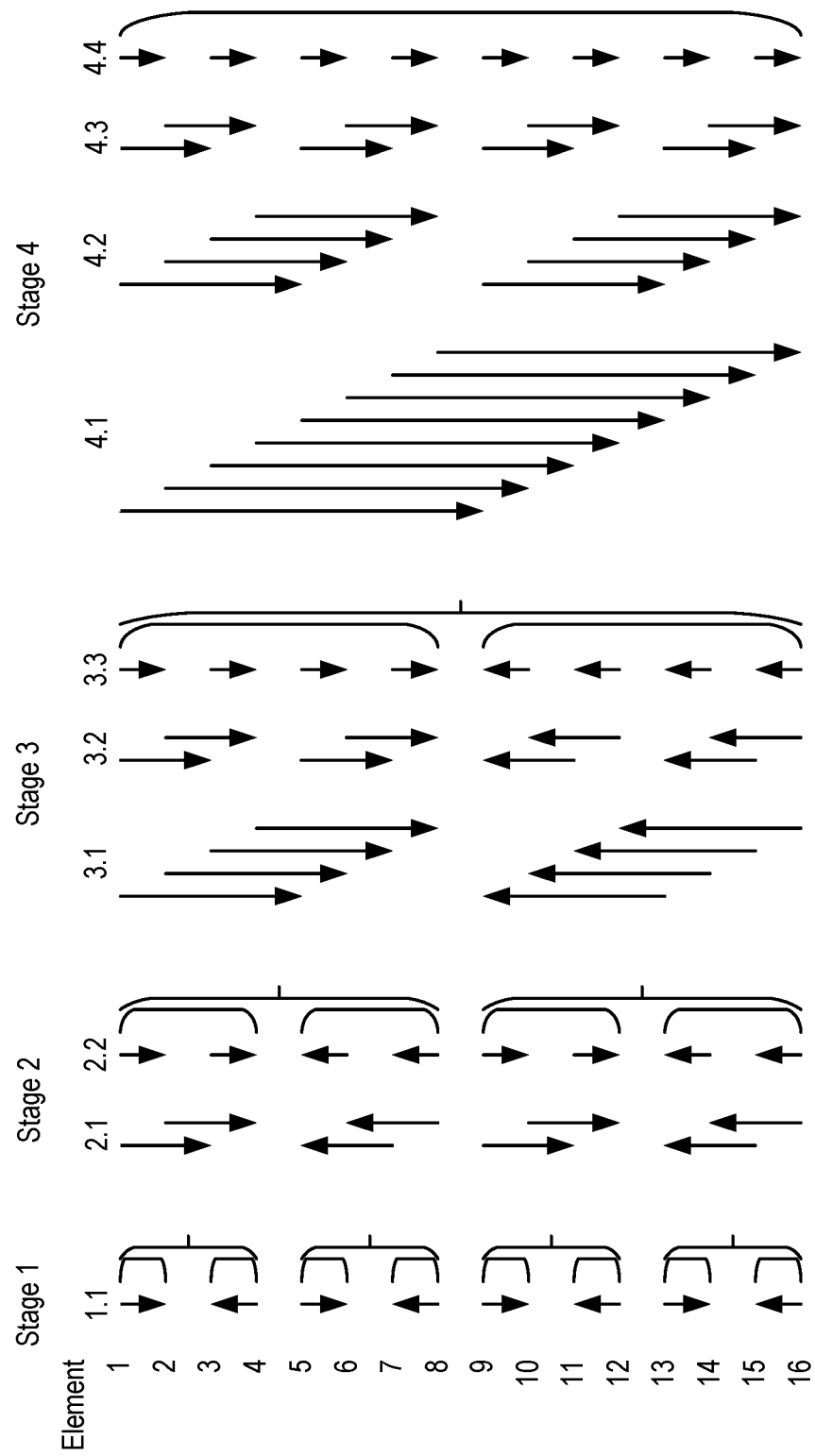
FIG. 2 provides a notional illustration of bitonic sorting, as may occur in examples of the arrangement of FIG. 1.

FIG. 2 provides a notional illustration of bitonic sorting, from low values to high values, for a data set with 16 elements. With 16 elements, there will be $\log_2(16)=4$ stages. In the first stage (stage 1), the entire set of 16 elements is broken into bitonic sequences of length four elements each. This results in four bitonic sequences (4 elements/sequence×4 sequences=16 elements). In each bitonic sequence, the first half is an ascending portion (downward arrow) and the second half is a descending portion (upward arrow). In stage 1, the first bitonic sequence is elements 1, 2, 3, and 4. Elements 1 and 2 are the ascending sequence (element 2 has a higher value than element 1), and elements 3 and 4 are the descending sequence (element 3 has a higher value than element 4).

For each subsequent stage, the length of the bitonic sequences doubles, until the final stage in which the entire set of elements is only an ascending sequence. For example, in stage 2, there are two bitonic sequences (elements 1-8, with elements 1-4 ascending and elements 5-8 descending, and elements 9-16, with elements 9-12 ascending and elements 13-16 descending). Stage 3 has a single bitonic sequence, with elements 1-8 ascending and elements 9-16 descending. Each main stage has a set of substages, in which elements are compared (and swapped, if necessary, based on the values and the ascending/descending condition in that portion of the sequence), starting with elements one-fourth the distance away in the bitonic sequence (half the distance in the ascending or descending portion), then halving that distance for each substage until adjacent elements are compared.

Longer sequences require merely extending this approach to a larger number of stages (e.g., a sequence of about a million elements requires 20 stages). Although an ascending sort order is illustrated, a descending sort order is possible by inverting the ascending/descending swap conditions or other solutions. For vector solutions, padding may be used to fill out a vector, by using the maximum value for the type for the remaining (padded) elements so that they sort at least as high as all other elements of the vector.

Figure 3:
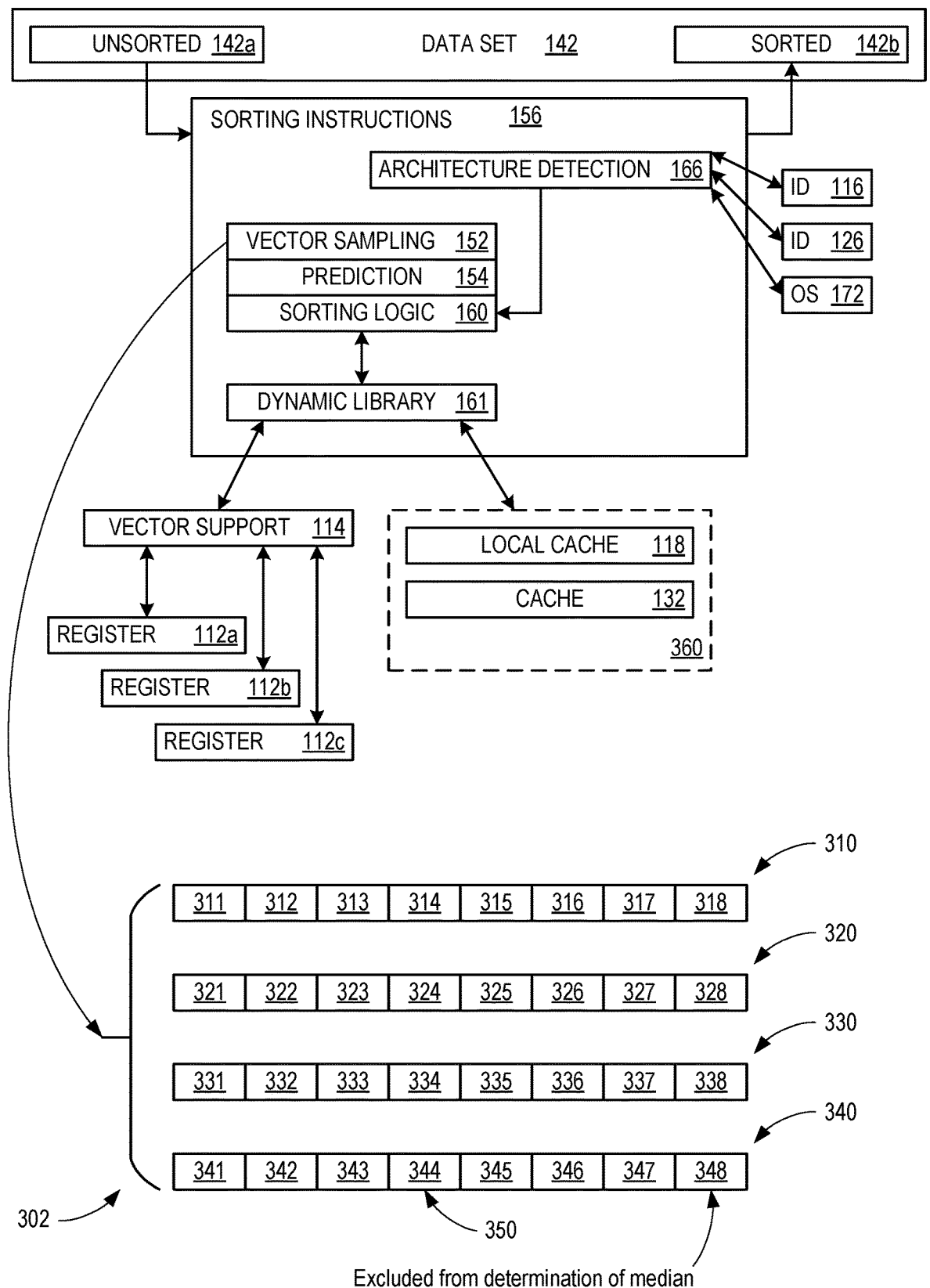
FIG. 3 illustrates interaction of computer-executable instructions with specific hardware implementations supporting vector operations, as may occur in examples of the arrangement of FIG. 1.

FIG. 3 illustrates interaction of computer-executable instructions with specific hardware implementations supporting vector operations. In FIG. 3, data set 142 is illustrated as having an unsorted state 142a that is provided to sorting instructions 156, that convert data set 142 into a sorted state 142b. Architecture determination 166 reads processor identifier 116, firmware identifier 126, and also identifies OS 172, to determine the microarchitecture version of computing device 900. Based on the identified microarchitecture version of computing device 900, dynamic library 161 is selected to perform the actual sorting operations.

Prior to beginning the actual sorting, however, vector sampling 152 pulls data elements from data set 142 and populates a sampling vector set 302. Sampling vector set 302 is illustrated as having four vectors, vector 310, vector 320, vector 330, and vector 340, although a different number of vectors may be used in other examples. As illustrated, each of vectors 310-340 has eight elements. Eight elements of 64-bit values is 512 bits.

Vector 310 has a data element 311, a data element 312, a data element 313, a data element 314, a data element 314, a data element 314, a data element 314, and a data element 318. Vector 320 has a data element 321, a data element 322, a data element 323, a data element 324, a data element 324, a data element 324, a data element 324, and a data element 328. Vector 330 has a data element 331, a data element 332, a data element 333, a data element 334, a data element 334, a data element 334, a data element 334, and a data element 338. Vector 340 has a data element 341, a data element 342, a data element 343, a data element 344, a data element 344, a data element 344, a data element 344, and a data element 348.

Vector sampling 152 identifies data element 344 as having the median value of sampling vector set 302, and sets this value as pivot value 350. The position of data element 344 in data set 142 is set as pivot position 352. In some example, to ensure that a true median is found (rather than the mean of the two middle values), sampling vector set 302 is truncated to have an odd-numbered subset (e.g., an odd quantity of elements). In the illustrated example, four vectors of length 8 each is 32 data elements. This is an even number. Eliminating data element 348 from the determination of the median means that the median is selected from a set of 31 data elements. This provides runtime benefits, in some examples, because the median is then certain to match at least one data element in data set 142.

Prediction layer 154 excludes portions of data set 142 from data move operations, as described below. Dynamic library 161, providing the actual sorting instructions that are abstracted by sorting logic 160, leverages vector support 114 to move data to/from, and perform operations on, vector registers 112a-112c. Sorting logic 160 (using dynamic library 161) also leverages local cache 118 and cache 132 (together, a cache 360) for faster operations that involve memory reads.

In some examples, sorting logic 160 supports different sizes of values within the vector registers 112a-112c. For example, in AVX-512 the registers are 512 bits wide and can handle 8 64-bit integers, 16 32-bit integers, or 32 8-bit integers. The example code below shows an implementation of AVX-512 bitonic sort using 64-bit signed integers. Some of the details may be specific to how the compiler exposes CPU operations to the programmer. Because the example is for 64-bit integers, the m512i_i64 array in the union represents 8 values.

```
typedef union__declspec(intrin_type) __declspec(align(64)) __m512i {
    __int8    m512i_i8[64];  __int16   m512i_i16[32];
    __int32   m512i_i32[16]; __int64   m512i_i64[8];
    unsigned __int8  m512i_u8[64]; unsigned __int16  m512i_u16[32];
    unsigned __int32 m512i_u32[16]; unsigned __int64 m512i_u64[8];
} __m512i;
static __m512i invertvec = _mm512_set_epi64(0, 1, 2, 3, 4, 5, 6, 7);
static __m512i comparevec1 = _mm512_set_epi64(3, 2, 1,0, 7,6, 5, 4);
static __m512i comparevec2 = _mm512_set_epi64(5, 4, 7, 6, 1, 0, 3, 2);
static __m512i comparevec3 = _mm512_set_epi64(6, 7, 4, 5, 2, 3, 0, 1);
static __m512i comparevec4 = _mm512_set_epi64(4, 5, 6, 7, 0, 1, 2, 3);
void BitonicSort8(__m512i& x) {
    // Step 1: Exchange (0,1), (2,3), (4,5), (6,7)
    // Note (_mm512_set_epi64 has low element last in arg list)
    // __m512i comparevec;// = _mm512_set_epi64(6, 7, 4, 5, 2, 3, 0, 1);
    __m512i permute = _mm512_permutexvar_epi64(comparevec3, x);
    __m512i min = _mm512_min_epi64(permute, x);
    __m512i max = _mm512_max_epi64(permute, x);
    // 0xAA = 0610101010
    // If mask bit is zero, copy from min else copy from max
    // It takes the (min, max) of each pair and writes them out
    x =_mm512_mask_mov_epi64(min, 0b10101010, max);
    // We are now pairwise sorted
    // Step 2: Exchange (0,3), (1,2), (4,7), (5,6)
    //comparevec = _mm512_set_epi64(4, 5, 6, 7, 0, 1, 2, 3);
    permute = _mm512_permutexvar_epi64(comparevec4, x);
    min = _mm512_min_epi64(permute, x);
    max = _mm512_max_epi64(permute, x);
    // 0xCC == 0611001100
    X =_mm512_mask_mov_epi64(min, 0b11001100, max);
    // Now we know that (0,1) <= (2,3) and (4,5) <= (6,7) but
    // we aren't sorted within adjacent pairs anymore
    // Step 3: Repeat Step 1
    //comparevec = _mm512_set_epi64(6, 7, 4, 5, 2, 3, 0, 1);
    permute = _mm512_permutexvar_epi64(comparevec3, x);
    min = _mm512_min_epi64(permute, x);
    max = _mm512_max_epi64(permute, x);
    x = _mm512_mask_mov_epi64(min, 0b10101010, max); // 0xAA
    // Now we have (0,1,2,3) and (4,5,6,7) sorted
    // Step 4: Exchange (0,7), (1,6), (2,5), (3,4)
    //comparevec = _mm512_set_epi64(0, 1, 2, 3, 4, 5, 6, 7);
    permute = _mm512_permutexvar_epi64(invertvec, x);
    min = _mm512_min_epi64(permute, x);
    max = _mm512_max_epi64(permute, x);
    x = _mm512_mask_mov_epi64(min, 0b11110000, max); // 0xF0
    // Now (0..3) <= (4..7) but we aren't sorted within those groups
    // Step 5: Exchange (0,2), (1,3), (4,6) (5,7)
    //comparevec = _mm512_set_epi64(5, 4, 7, 6, 1, 0, 3, 2);
    permute = _mm512_permutexvar_epi64(comparevec2, x);
    min = _mm512_min_epi64(permute, x);
    max = _mm512_max_epi64(permute, x);
    x =_mm512_mask_mov_epi64(min, 0b11001100, max); //0xCC
    // Now (0,1) <= (2,3) <= (4,5) <= (6,7) but we aren't sorted
    // within these pairs
    // Step 6: Repeat Step 1
    //comparevec = _mm512_set_epi64(6, 7, 4, 5, 2, 3, 0, 1);
    permute = _mm512_permutexvar_epi64(comparevec3, x);
    min = _mm512_min_epi64(permute, x);
    max = _mm512_max_epi64(permute, x);
```

```
x = __mm512_mask_mov_epi64(min, 0b10101010, max); // 0xAA
// Now we are sorted (0..7) }
```

Currently, there isn't a direct compare and swap operator in AVX-512, however, it is possible to use the available instructions to achieve the same result. There is an instruction to permute (swap) elements within the vector, while retaining them in a copy of the original. It is possible to supply the source and target for the permute and then use min and max operators to pull the smallest and largest for a pair into the separate vectors. There is also a masked move operation that permits specifying which values to move from one of two vectors. This can be used to pull the subset of the min and max vectors for a given comparison based on the progress of the sort. The comments above explain each mask used for each operation.

In a quicksort operation, a value is chosen each round as pivot value 350. Data elements are moved to the left or right (in a sequence) based on comparison against pivot value 350. As such, the quality of pivot value 350 (e.g., how close it is to the median of the sequence) is important. A good pivot value reduces the number of partitions, and thus data movements, that occur during sorting. A trade-off exists between the time it takes to identify a high-quality pivot value and the number of partitions that value avoids—and therefore the time required to perform the sort. For larger data sets, the risk of selecting a sub-optimal (e.g., poor) pivot value generally increases with simplistic algorithms.

An example approach for selecting a pivot value is to sample a predetermined count of elements that are equally spaced across a partition, and identify the median of the sample. In general, three or four vectors, which means 24 or 32 elements (8×3=24, 8×4=32), work well, and vector instructions may be used to efficiently identify the median of the elements in the vectors. This approach may require identifying the index (e.g., location in a data set) of the element that has been identified as the median of the sample, so that the element may be moved prior to partitioning. However, with an even number of elements, selecting the value to the left or right of the middle (e.g., no the true median) may result in branch prediction misbehavior. Thus, some examples crop the sample to an odd number of values (e.g., 23 or 31 elements) so that there is a true median.

A variation of a normal bitonic sort is a "bitonic sort with payload" in which a set of index values for elements being sorted is moved correspondingly with the elements themselves (e.g., that are being sorted). In this variation, the masked move step of a sort process is changed to perform a comparison into a separate mask of the elements that are equal and then the payload is also moved, based on the resulting mask output from the comparison. This identifies which elements moved (and which did not), enabling use of the masked move operation described earlier. Example code is provided:

```
#define AVX512SORT_MASK_MOVE_PAYLOAD(n, arg1, mask, arg2) \
    vectemp##n = __mm512_mask_mov_epi64( arg1##n, mask, arg2##n ); \
    permutepayload = __mm512_permutexvar_epi64(comparevec, vecpayload##n ); \
    maskpayloadmove = __mm512_cmp_epi64_mask(vec##n, vectemp##n, _MM_CMPINT_EQ); \
    vecpayload##n = __mm512_mask_mov_epi64(permutepayload, maskpayloadmove, vecpayload##n ); \
    vec##n = vectemp##n;
```

In the payload approach, given that the goal is to find the $N^{th}$ element of the set of vectors, it is not necessary to perform the final phases of a bitonic merge on vectors, except for the one that contributes elements to the vector containing the median. Thus, finding the exact position of a single $N^{th}$ element is computationally less expensive than performing a full sort, because operations unrelated to determining the exact position of the element needed may be skipped.

An alternative approach is to merely sort the elements in the sample vectors, identify the median, then search through a copy of the original vector to locate the element with the median value, and obtain that element's index. Example code is provided:

```
BitonicSortAndMerge32(vec[0], vec[1], vec[2], vec[3]);
for (int i =0; i < cVectors; i++) {
    __mmask8 mask = __mm512_cmp_epi64_mask(pivotvec, vec2[i], _MM_CMPINT_EQ);
    if (mask) {
        //pivotpos = (i * VectorSize) + _tzcnt_u32(mask);
        assert(vec2[i].m512i_u64[_tzcnt_u32(mask)] == pivotval);
        pivotpos = payload[i].m512i_u64[_tzcnt_u32(mask)];
        break;
    }
}
```

By improving the estimation of the unsorted data set's median, a superior pivot position may be located, even for differing distributions of data, thereby providing quicker overall runtimes (which uses less CPU and memory resources). This is possible because the time invested in identifying a high quality pivot value may reduce the number of partitions required to complete the sort. The reduction in the number of data moves offsets the time invested in searching for a good pivot value.

In general, with modern CPUs and memory hierarchies, write operations are expensive, as measured in time, relative to read operations. By adding a predict and validate phase when selecting pivot value 350, it is possible to reduce write operations. Various heuristics may be used to determine predictions, which involve balancing the cost of the work required to make a prediction and validate it versus the potential net improvement on the overall sorting runtime (and hence improvement in management of computing resources).

Some examples select the median value by excluding one of the values in at least one of the vectors, in order to select the median from an odd number of elements. Otherwise, the median value selected from an even number of elements may be the mean of the two middle values. Selection of pivot value 350 from an even number of elements risks degrading performance.

When sampling to identify the median value to use as pivot value 350, some examples also perform an additional assessment on the sampled elements: determining whether multiple elements all have the same value as pivot value 350. This may require an additional vector operation. If multiple duplicate elements are identified, a prediction of "equals" is performed by prediction layer 154 and returned from the routine that selects pivot value 350, as an extra argument. If there are elements that are not equal to pivot value 350, in some examples, a second comparison is done to compare the vectors sampled over the domain. In some examples, this comparison is performed across the vectors, for simplicity. If the vectors created from samples earlier in the vector are all less than the vectors of the sampled elements (meaning they are pairwise sorted across vectors, not that everything is guaranteed sorted), then a prediction of "ascending" is returned from the pivot selection process. If neither of these conditions are met, no prediction is returned, and the next round of the quicksort partition continues normally. A similar comparison may also be made for a descending prediction. The prediction process (e.g., performed by prediction layer 154) is thus able to determine that the sampled data elements are already sorted or constant.

This approach may offer significant speed improvements for data that is highly repeating or is already sorted. Some examples execute a version of the following code, after the selection of pivot value 350, and prior to the primary partitioning. Both validation phases abort quickly if the prediction is found to be incorrect, and revert to standard partition logic.

```
if (1 == ePredict) // Prediction: Constant {
    __m512i pivotvec = _mm512_set1_epi64(pivotval);
    __m512i leftvec;
    __mmask8 mask = 0xFF;
    while (0xFF == mask && left < right - VectorSize) {
        leftvec = _mm512_loadu_si512(&array[left]);
        mask = _mm512_cmp_epi64_mask(leftvec, pivotvec,
            _MM_CMPINT_EQ);
        if (0xFF == mask)
            left += VectorSize;
    }
    while (left < right && array[left] == array[right]) {
        left++;
    }
    if (left == right) {
        // We have a whole range that is the same. Signal this to the calling routine
        // This will avoid any further recursions
        outptnlow = low;
        outptnhigh = high;
        return;
    } else {
        // reset prediction and do normal sort
        ePredict = 0;
        left = low;
        right = high;
        goto NoPrediction;
    }
} else if (2 == ePredict) { // prediction: ascending
    while (left < right && array[left] <= array[left + 1]) {
        left++;
    }
    if (left == right) {
        outptnlow = low;
        outptnhigh = high;
        return;
    } else {
        ePredict = 0;
        left = low;
        right = high;
    }
}
```

This logic attempts to validate whether the entire partition is constant (equal to pivot value 350) or ascending (all values monotonically non-decreasing). If either condition is true, the operation concludes that both are sorted and returns without performing additional work. The purpose is to quickly identify sorted input, in order to avoid writing anything at all, and to identify constant input (which degenerates to $O(N^2)$ in normal quicksort). In common real-world data sets, there may be multiple duplicate element values that lead to constant-valued partitions. Thus, this approach is effective at speeding up vectorized quicksort algorithms.

With a truly random data set, the number of duplicate values may be expected to be low. However, in common real-world data distributions, the values may take on a normal (Gaussian) distribution with a significant number of repeated values. An example is a product identification number that may appear repeatedly in an inventory list or a list of items purchased by consumers. As a quicksort process partitions and moves data, large groups of repeating values may be encountered. In some examples, if the pivot value is one of those, the soft 3-way quicksort identifies other values equal to the pivot value and avoids sorting those, because they are already in the correct positions. In some examples, prediction layer 154 determines whether the data being sampled is constant and will then determine whether the entire range is constant. If so, the data is validated in place, which is faster than sorting (e.g., reading, comparing, moving, and writing).

AVX-512 instructions may experience a clock frequency penalty of up to 40%, in some scenarios. AVX-512 instructions induce a processor (e.g., processor 110) to use so much power that a significant amount of heat may be generated. The defense, for thermal protection of the processor, is to slow the clock by 40% to reduce heat. When this occurs may vary by processor (e.g., different processor identifiers 116), because there may be a different number of vector registers available on different microarchitecture versions.

Because using vector instructions may generate more heat, dropping the clock frequency, the overall performance depends on the use of vector instructions either not generating enough heat to trigger slowdown (e.g., only small data sets below a threshold size are sorted) or using an algorithm that provides sufficient speed improvement by using vectorization than the speed penalty that is imposed by the clock slowdown.

In some examples, different versions of the sort instructions are optimized for different microarchitecture versions (e.g., those without AVX-512, and those with AVX-512, with differing register configurations), compiled, and packaged as optional dynamic libraries, to use based on the detected microarchitecture version of the host computing platform.

Some examples perform a wider bitonic sort than 512 bits, even with processors that support 512 bit vectors. Such examples perform a trade-off of the quantity of compares and moves in memory for partitioning versus how many steps of the bitonic sort algorithm may be executed in a straight line fashion (e.g., without risking an incorrect branching prediction). To construct a bitonic sort that is wider than the length of a vector, an algorithm similar to that shown in the following pseudo-code may be used:

Sort each vector;
Invert one vector and store that as a copy in a temporary variable;
Find the minimum and maximum values across the permuted copy and the other vector, storing in two more temporary variables;
Perform the merge phase of the bitonic algorithm within each vector.

This approach is general and may be performed for different size vectors. For example, sorting two 8-element 64-bit value vectors into a single sorted 16-element uses the same logic.

Upon mapping multiple vectors into the processor, multiple phenomena may be observed. The comparison and permute vectors are constant and may be shared. This means that operating on multiple vectors in a single process requires fewer instructions than if the vectors were handled with separate processes. Additionally, because different processors may support different numbers of vector registers, different compiler settings that are specific to the microarchitectures may provide architecture-specific optimized sorters. For example, while the instruction set supports 32 logical registers, register aliasing may internally map this to fewer physical registers in earlier microarchitecture versions. Performance differences exist where vector registers are cached instead of reloaded. In some examples, using 128 to 256 64-bit elements for bitonic sorting by having the compiler enable AVX-512-specific optimizations enables the compiler to obtain better leverage of the vector registers 112a-112c and avoid re-loading elements from memory. For some compilers, AVX-512-specific optimizations are enabled with an /arch:AVX512 flag.

Real-world data distributions are typically not truly random, and there are some data distributions for which sorting performance varies significantly. The approach that adapts to different data distributions improves performance over a range of data distributions, both to avoid O(N²) performance, and also to sort faster than would occur over random data (e.g., leveraging existing ordering to reduce sorting steps).

A traditional 3-way quicksort selects two pivot values and moves data to high/middle/low, rather than just high/low (as would occur with a single pivot value in a 2-way sort. A new approach is provided here. Rather than partitioning into greater/equal/less than pivot value 350, some examples use a multi-step approach. First, a 2-way partitioning is performed using vector instructions. When that is completed, elements adjacent to the pivot position (e.g., the element that had been selected as pivot value 350) are assessed for whether they have the same value (as pivot value 350). If so, the partition boundary of the "less than or equal to" partition is adjusted to reduce the size of the next round. This is performed using vector instructions to efficiently consider groups of equivalent values. While there is no guarantee that the values are actually sorted to have the same values adjacent to pivot position 352, in practice this happens enough in real-world data distributions to obtain a speed benefit. This approach is termed a "soft 3-way quicksort".

In some examples, a soft 3-way quicksort requires that start and end indices for each partition round are tracked. Example code is provided:

```
outptnlow = outptnhigh = left_w - 1;
if (outptnlow > low && array [outptnlow - 1] == pivotval) {
    __m512i val;
    ULONGLONG limit = low + VectorSize; // we want at least a vector at a time for this comparison logic
    while (outptnlow > limit) {
        val = _mm512_loadu_si512(&array[outptnlow - VectorSize]);
        __mmask8 mask = _mm512_cmp_epi64_mask(val, pivotvec, _MM_CMPINT_EQ);
        if (0xFF == mask)
            outptnlow -= VectorSize;
        else
            break;
    }
}
```

Because recursion is used in bitonic sorting, degenerate data distributions and poor pivot value selection may result in a stack overflow. Proper selection of the window to recurse next is important. In general, selecting a smaller range provides the best behavior for the next range to partition, in terms of reducing the risk of stack overflow. This takes the output from the modifications needed for the soft 3-way quicksort model and uses these as a low/high model on a stack that is used to store the remaining partitions. This approach avoids running out of memory on non-random distributions, where otherwise stack size similar to the total data size may be needed to complete the sort. Depending on the compiler, this may also allow the use of conditional instructions that avoid conditional branches, and thus reduce the occurrence of branch mispredictions. Example code is provided:

```
int iOffsetAdjust = (high - partition_border_high > partition_border_low - low) ? 0 : 2;
rgStack[ulTop + iOffsetAdjust] = start_high_range;
rgStack[ulTop + iOffsetAdjust +1] = high;
rgStack[ulTop + (iOffsetAdjust? 0 : 2)] = low;
rgStack[ulTop+ (iOffsetAdjust ? 1 : 3)] = end_low_range;
ulTop += 4;
```

Some examples use a static stack to help store the ranges for not-yet-handled partition operations. A sorting algorithm with O(N log₂ N) performance, that operates on a data set having one billion elements, would typically need a stack of around 20-21 elements (based on the log base 2 of 1 billion). To improve stack overflow resistance, a stack size of 100 elements is used in some examples.

A simplistic implementation of a quicksort algorithm uses an array into which the boundaries (e.g., start, end) are pushed as a stack. Unfortunately, this simple approach operates acceptably for some data distributions (e.g., truly random date), but not for data that has already been at least partially sorted. In cases that risk degeneration to O(N²) runtimes, this simple approach may also create a pattern on the stack that produces degenerately small partitions of a single value. This risks recursing without measurable progress, even as the number of elements on the stack grows rapidly. In a worst-case scenario (which should be contemplated for commercial products), a stack size of 2×N would be needed to sort N elements without overflowing. Rather, some examples of the present disclosure place values on the stack in a more useful order (e.g., the largest remaining section goes on the bottom, and smaller ones on the top) to avoid this, which enables use of a significantly smaller stack size (e.g., 20 to 40 groups of 2).

Runtimes are largely driven by the number of partitioning calls, and the number of partitioning calls is driven by the quality of pivot value 350 (e.g., how close pivot value 350 is to the actual median of the data set). Partitioning writes data for the range being considered, and because writes are relatively expensive in time, partitioning is the primary factor in the overall runtime.

Examples includes providing prefetching hints to the processor, to permit the processor to begin memory accesses earlier, thereby minimizing pipeline memory stalls. Because the core partition algorithm reads through each side of a section of memory with a predictable pattern, the likely next memory locations that will be accessed is identifiable.

The code example below is a vectorized partition operation in which N values are compared against a pivot vector and then the smaller (or equal) values are moved to the left side, while the larger values are moved to the right side. Leveraging the predictable pattern of memory reads, a hint to start loading the next chunks of memory from each side of the range being partitioned is provided, effectively side-stepping some of the memory latency.

```
// Compare the loaded data against the pivot value to obtain a mask
// of the elements that should sort low/high.
    __mmask8    mask = _mm512_cmp_epi64_mask(val, pivotvec, _MM_CMPINT_LE);
    const ULONGLONG cLower = __popcnt(mask);
    const ULONGLONG cHigher = VectorSize - cLower;
    // Write out smaller values into the left array.
    _mm512_mask_compressstoreu_epi64(&array[left_w], mask, val);
    left_w += cLower;
    // Remaining elements go to the right array
    right_w -= cHigher;
    _mm512_mask_compressstoreu_epi64(&array[right_w], ~mask, val);
```

```
CachePrefetch(&array[left]);
CachePrefetch(&array[right - VectorSize]);
```

Common OSs use virtual memory addressing, and unfortunately, translating virtual addresses into physical addresses (where the data and instructions are actually stored) is expensive in terms of time and computing resources. The translate process is driven by the TLB access time, the number of OS page tables, and the OS and hardware page walking performance. Sorting larger data sizes benefits from having larger pages support, which improves overall sort performance by reducing the number of TLB misses. For some OSs, the option MEM_LARGE_PAGES is used on calls to VirtualAlloc2 to set a page size.

In some examples, to minimize being memory bound or thrashing unnecessarily, cache contents use alignment hints for key variables and structures. In such examples, accesses to cache contents is aligned to the physical boundaries of the hardware. Failing to ensure alignment may cause a single memory request to translate into two memory requests (e.g., across the boundary).

As noted above, in addition to differences based on differing microarchitectures, performance improvements vary considerably based on data distribution, selection of pivot value 350, whether prediction (e.g., constant/ascending) is used, and the use of a soft 3-way quicksort. Some general observations on performance differences and advantages relative to two common existing sorting algorithms are noted below. Data distributions tested are indicated in Table 1:

TABLE 1

Data Distributions Tested

| Distribution | Description |
| --- | --- |
| Random | Pseudorandom values from std::mt19937, initialized with a seed from std::chrono::high_resolution_clock::now( ).time_since_epoch( ).count( ) |
| Constant | 100 elements having the same value |
| Ascending | 0 to N-1 in ascending order |
| Descending | N-1 to 0 in descending order |
| 0 . . . 3 Repeating | The values 0, 1, 2, 3 repeated |
| Binomial 10K | Std::binomial_distribution<LONGLONG> with parameters of 10000 values and a distribution parameter of 0.5 |
| AscDesc | An "adversarial" bitonic distribution with the first half of the elements ascending and the second half descending from N/2 to 1 |

General performance comparisons, noting advantages relative to prior sorting solutions, for examples of the disclosure, are provided in Table 2:

TABLE 2

Performance comparisons

| Distribution | Performance Comparison |
| --- | --- |
| Random | 5× to 9× speed |
| Constant | 1.3× to 9× speed |
| Ascending | 23× to 106× speed |
| Descending | 1× (no improvement) to 4× speed |
| 0 . . . 3 Repeating | 1.6× to 8× speed |
| Binomial 10K | 3× to 7× speed |
| AscDesc | 2× to 25× speed |

The results indicated in Table 2 are for the best performing option set tested. Multiple options for aspects of the disclosure were tested, as indicated in Table 3, and observations are noted in the following:

TABLE 3

Options Tested

| Option | Description |
| --- | --- |
| 1V/4V | Pivot value selection performed using a single vector (7 values) or four vectors (31 values) |
| P/NP | Prediction/No Prediction of constant and ascending values |
| 2W/3W | Only 2-way or soft 3-way quicksort |

For a constant data distribution, the soft 3-way quicksort avoids substantial performance penalties as the number of duplicate values grows. For a repeating data distribution, the soft 3-way quicksort improves performance as the number of data elements increases. When there are few distinct values, pivot value selection might pick the maximum value for the range and everything sorts to the left of pivot value 350 (e.g., the comparison always results in a less than or equal). With a 2-way quicksort, this may be problematic. However, with the soft 3-way quicksort, adjacent values that are equal to pivot value 350 move the end of the range to the left, to be smaller.

For purely random data, neither the prediction logic nor the soft 3-way quicksort provide noticeable improvements. However, the overhead of these options are sufficiently minimal, and the risk of encountering purely random data in a real-world data set is sufficiently low, such that these options should be considered for use in most implementations. For binomial data distributions, sort performance is worse than for random data without prediction logic nor the soft 3-way quicksort. This is likely because the behavior of the sort when pivot value 350 is repeated becomes quadratic for partitions that do not have well-behaved data distribution.

For some compilers, using the /arch:avx512 setting generates machine language that leverage the vector registers 112a-112c to retain elements within the processor (e.g., retains data elements within vector registers 112a-112c). However, different microarchitecture versions may have different numbers of these vector registers. Thus, examples use differently-compiled versions, specific to different microarchitectures. For example, differences may be implemented in source code (e.g., tuning the algorithm by unrolling loops based on number of registers to best match capability of each microarchitecture) and/or by use of different compiler settings.

AVX-512 vector instructions are not available on all processors. Some examples include versions that do not rely on AVX-512 vector instructions. Each variation implementation has an entry point in a DLL, which has been compiled with the compiler settings that are optimized for a particular microarchitecture version. The microarchitecture version is queried, and the appropriate DLL is selected.

Figure 4:
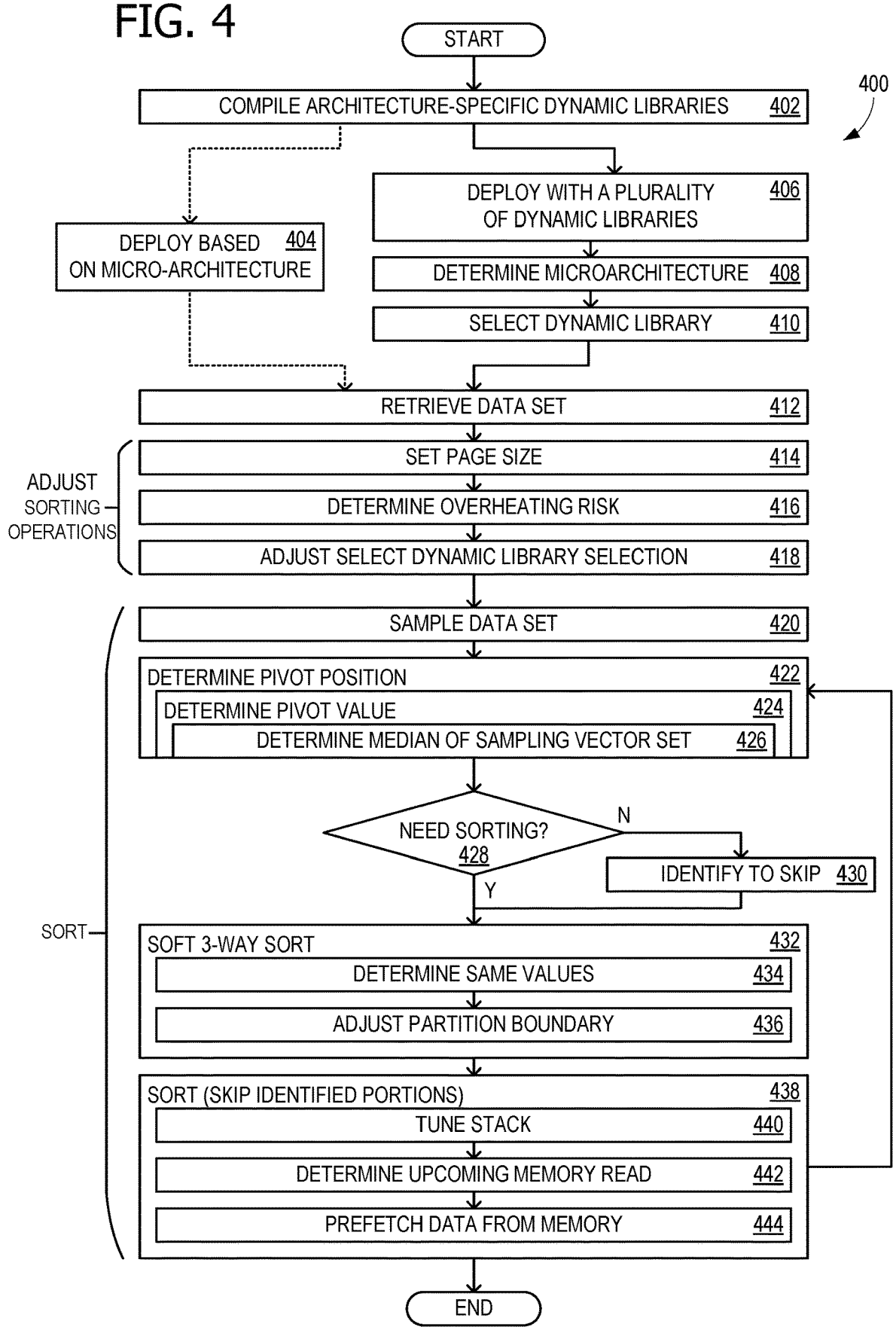
FIG. 4 shows a flowchart illustrating exemplary operations associated with the arrangement of FIG. 1.

FIG. 4 shows a flowchart 400 illustrating exemplary operations associated with arrangement 100. In some examples, operations described for flowchart 400 are performed by computing device 900 of FIG. 9. Flowchart 400 commences with operation 402, in which an architecture-specific dynamic library implementation is tuned (e.g., optimized) and compiled for each microarchitecture version of a plurality of microarchitecture versions. These are shown in FIG. 1 as dynamic libraries 161-163. In some examples, compiling the architecture-specific dynamic library implementation comprises adjusting the dynamic library implementation for a count of vector registers available in the microarchitecture version.

Each dynamic library implementation of sorting instruction is tuned to a selected one of a plurality of microarchitecture versions. In some examples, the dynamic library implementation of sorting instructions comprises vector instructions. In some examples, the vector instructions comprise AVX vector instructions, such as AVX-512 vector instructions. Options exist for matching an architecture-specific dynamic library implementation with a specific microarchitecture version.

In one option, operation 404 deploys, to a first computing device (e.g., computing platform 102), a first dynamic library implementation tuned to a microarchitecture version of the first computing device, and deploys, to a second computing device (e.g., computing platform 180), a second dynamic library implementation tuned to a microarchitecture version of the second computing device. The second dynamic library implementation is different than the first dynamic library implementation.

In another option, operation 406 deploys, to a computing device (e.g., computing platform 102), a plurality of dynamic library implementations (e.g., dynamic libraries 161-163) of sorting instructions. Operation 406 determines a microarchitecture version of computing device 900, which will be executing the sorting of data set 142. In some examples, determining the microarchitecture version comprises determining a processor identifier 116. In some examples, determining the microarchitecture version comprises determining a motherboard configuration, using firmware identifier 126. In some examples, determining the microarchitecture version comprises determining a memory cache configuration, using firmware identifier 126 and/or processor identifier 116, because there may be cache memory both within processor 110 and on motherboard 104. In some examples, determining the microarchitecture version comprises determining an OS configuration of OS 172.

Operation 410 selects a dynamic library implementation (e.g., one of dynamic libraries 161-163) of sorting instructions from a plurality of dynamic library implementations of sorting instructions, based on at least the identified microarchitecture version. Sorting instructions 156 are now optimized for processor 110, because of the selection from a plurality of deployed dynamic libraries (operations 406-410), or deployment of a custom build (operation 404). Operation 412 retrieves data set 142 from the computer storage medium (e.g., memory 130). In some examples, the computer storage medium is located in a cloud computing node. In some examples, data set 142 comprises a database located on a remote node from a user.

Operations 414-418 adjust sorting operations further, based on the size of data set 142, in addition to the architecture-specific selection of the sorting implementation. Operation 414 sets a page size. In some examples, the page size is set based on the size of data set 142. For example, a larger data set may warrant a larger page size, whereas a small data size may warrant a smaller page size, or even the default page size for OS 172. Operation 416 determines a risk factor for an overheating clock penalty on a microarchitecture version. In some examples, the risk factor for the overheating clock penalty indicates an estimate of the vector instruction workload. A larger data set, with heavy use of vector operations may overheat processor 110.

Operation 418 may further select between a plurality of sorting instruction implementations, in which one implementation provides a lower risk of incurring the overheating clock penalty, based on an expected performance improvement with vector instructions relative to an overheating clock penalty. In some examples, the selection in operation 418 may over-ride the selection in operation 410.

Sorting is performed in stages, as indicated in FIG. 2. Operations 420-444 implement the sorting, with the accelerations provided by operations 420-436. Operation 420 samples, using processor 110, data set 142 with sampling vector set 302. Sampling vector set 302 comprises at least one vector. In some examples, sampling vector set 302 comprises at least four vectors. Each vector comprising a plurality of data elements of data set 142.

Operation 422 determines pivot position 352 (using processor 110) within data set 142, and is implemented with operations 424-426. Operation 424 determines pivot value 350 for data set 142, such that the data element at pivot position 352 has pivot value 350. Operation 426 determines, using a vector instruction executed by processor 110 in some examples, a median value of the data elements in sampling vector set 302. In some examples, determining the median value comprises determining the median value from an odd-numbered subset of sampling vector set 302, less than a total number of data elements in sampling vector set 302. For example, 31 of 32 data element values may be used, as shown in FIG. 3.

Decision operation 428 determines whether multiple data elements in sampling vector set 302 have a same value as the median value or are already sorted. In some examples, determining whether multiple data elements in sampling vector set 302 are already sorted comprises determining whether data elements are pairwise sorted across vectors 310-340 (e.g., using a vector instruction). If so, then sorting is not needed for this portion of data set 142. If sorting is not needed, operation 430 identifies that at least a portion of data set 142 is to be excluded from at least a portion of sorting operation 438, based on at least determining that the data elements in sampling vector set 302 have the same value as the median value or are already sorted.

Operation 432 is an implementation of a soft 3-way sort, using operations 434 and 436. Operation 434 determines whether data elements adjacent to the pivot position also have pivot value 350. Based on at least determining that data elements adjacent to the pivot position also have pivot value 350, operation 436 adjusts a partition boundary to form a 3-way sorting arrangement of less than pivot value 350, equal to pivot value 350, and greater than pivot value 350.

Operation 438 performs the actual sorting, using processor 110, data set 142 using the median value as pivot value 350. Sorting data set 142 is carried out using operations 440-444, and uses processor 110 to move data elements of data set 142 into and out of memory locations in memory 130. In some examples, sorting data set 142 uses pivot value 350 and the adjusted partition boundary. In some examples, the sorting excludes, from at least the portion of sorting operations, any portion of data set 142 identified as to be excluded in operation 430. In some examples, sorting data set 142 comprises sorting data set 142 using the selected dynamic library implementation of sorting instructions. In some examples, sorting data set 142 comprises sorting data set 142 using vector instructions.

Operation 440 tunes the stack to avoid an overflow condition. Operation 442 determines, based on a pattern of memory reads, an upcoming memory location to read. Operation 444 prefetches a data element from the upcoming memory location to read.

FIG. 5 shows a flowchart 500 illustrating an exemplary practical application of arrangement 100. Flowchart 500 commences with operation 502, which determines a runtime for sorting data set 124 on a first microarchitecture version (e.g., of computing platform 102). Operation 504 determines a runtime for sorting data set 142 on a second microarchitecture version (e.g., of computing platform 180). Operation 506 generates computing platform comparison report 182 that indicating a performance comparison of vector instructions on the second microarchitecture version relative to vector instructions on the first microarchitecture version.

Figure 6:
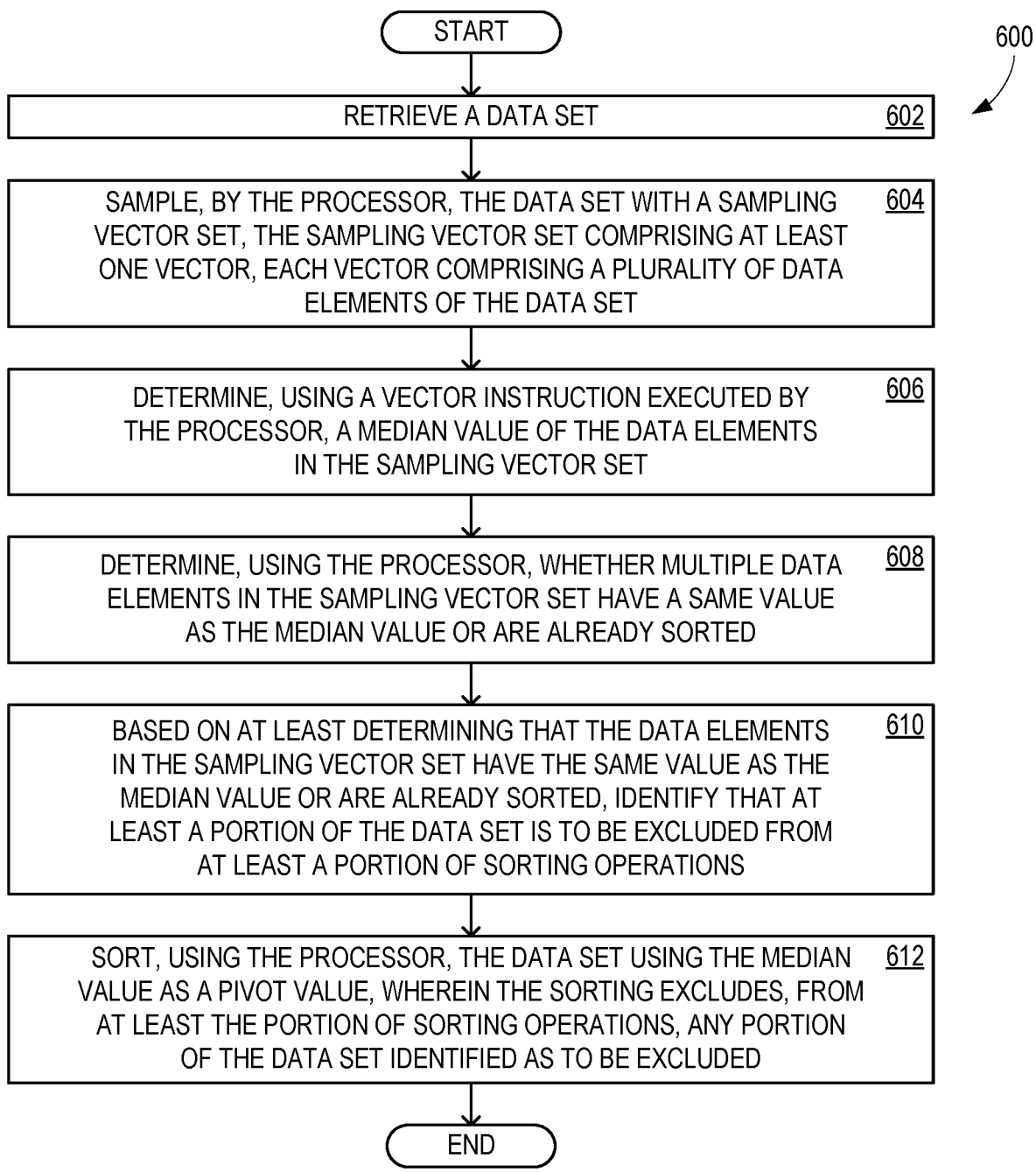
FIG. 6 shows another flowchart illustrating exemplary operations associated with the arrangement of FIG. 1.

FIG. 6 shows a flowchart 600 illustrating exemplary operations associated with arrangement 100. In some examples, operations described for flowchart 600 are performed by computing device 900 of FIG. 9. Flowchart 600 commences with operation 602, which includes retrieving, from a computer storage medium, a data set. Operation 604 includes sampling, by a processor, the data set with a sampling vector set, the sampling vector set comprising at least one vector, each vector comprising a plurality of data elements of the data set.

Operation 606 includes determining, using a vector instruction executed by the processor, a median value of the data elements in the sampling vector set. Operation 608 includes determining, using the processor, whether multiple data elements in the sampling vector set have a same value as the median value or are already sorted. Operation 610 includes, based on at least determining that the data elements in the sampling vector set have the same value as the median value or are already sorted, identifying that at least a portion of the data set is to be excluded from at least a portion of sorting operations. Operation 612 includes sorting, using the processor, the data set using the median value as a pivot value, wherein the sorting excludes, from at least the portion of sorting operations, any portion of the data set identified as to be excluded.

Figure 7:
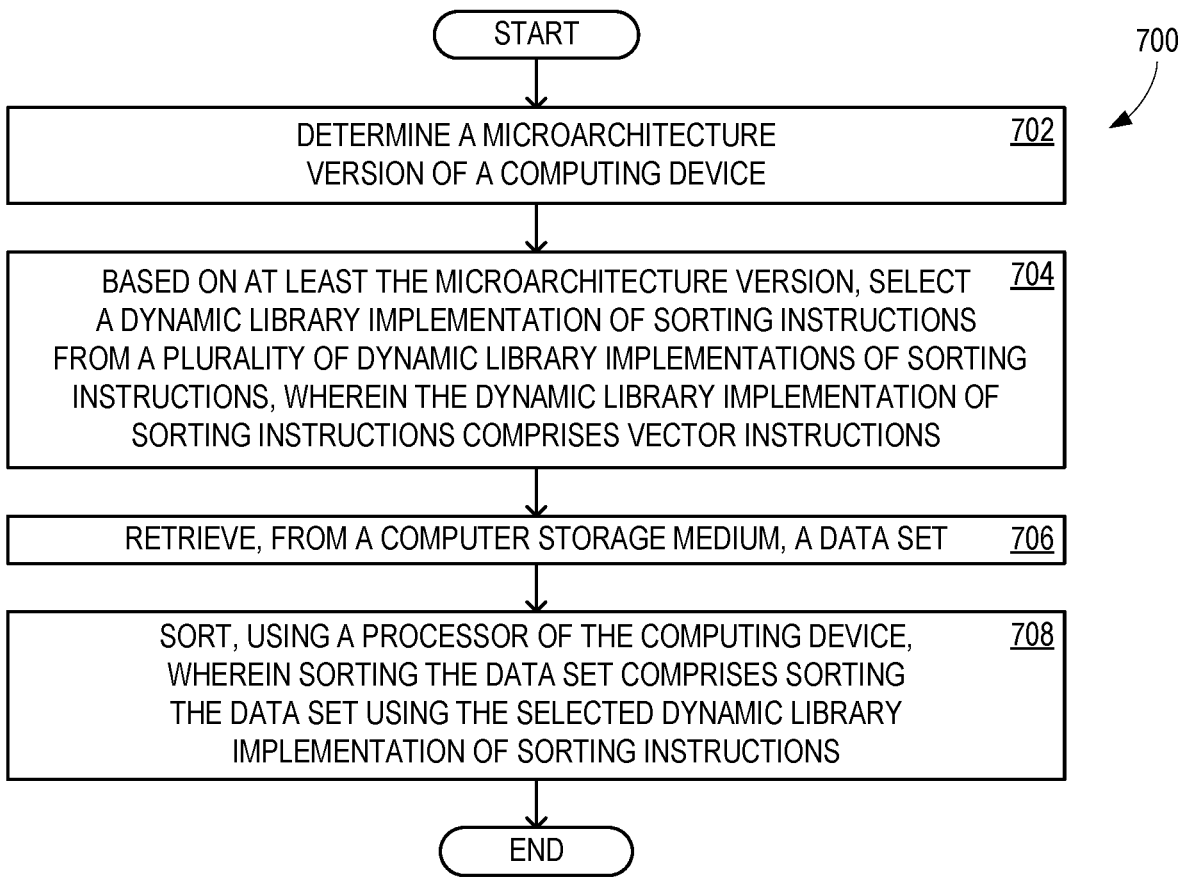
FIG. 7 shows another flowchart illustrating exemplary operations associated with the arrangement of FIG. 1.

FIG. 7 shows a flowchart 700 illustrating exemplary operations associated with arrangement 100. In some examples, operations described for flowchart 700 are performed by computing device 900 of FIG. 9. Flowchart 700 commences with operation 702, which includes determining a microarchitecture version of a computing device.

Operation 704 includes, based on at least the microarchitecture version, selecting a dynamic library implementation of sorting instructions from a plurality of dynamic library implementations of sorting instructions, wherein the dynamic library implementation of sorting instructions comprises vector instructions. Operation 706 includes retrieving, from a computer storage medium, a data set. Operation 708 includes sorting, using a processor of the computing device, wherein sorting the data set comprises sorting the data set using the selected dynamic library implementation of sorting instructions.

Figure 8:
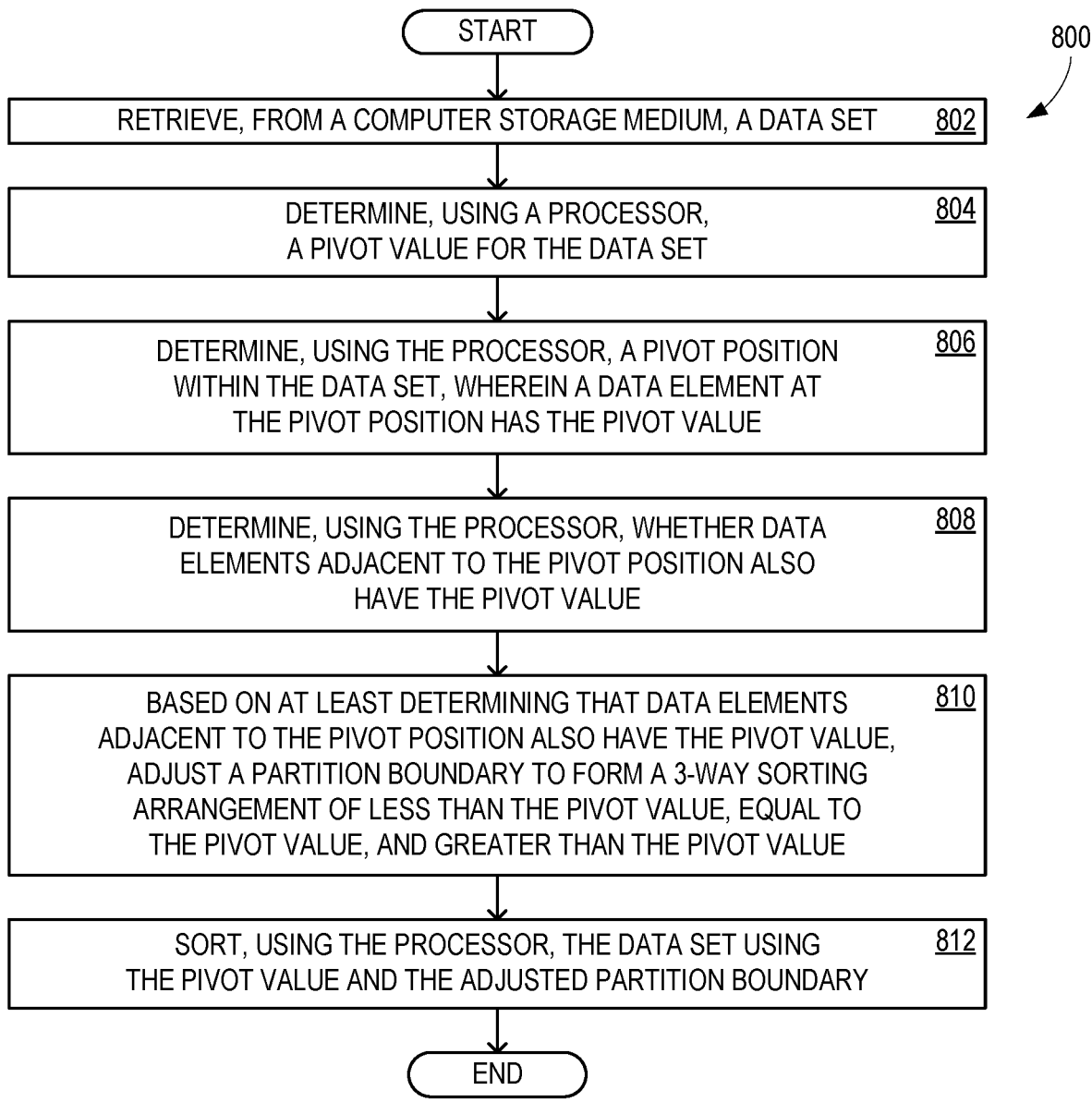
FIG. 8 shows another flowchart illustrating exemplary operations associated with the arrangement of FIG. 1.

FIG. 8 shows a flowchart 800 illustrating exemplary operations associated with arrangement 100. In some examples, operations described for flowchart 800 are performed by computing device 900 of FIG. 9. Flowchart 800 commences with operation 802, which includes retrieving, from a computer storage medium, a data set. Operation 804 includes determining, using a processor, a pivot value for the data set.

Operation 806 includes determining, using the processor, a pivot position within the data set, wherein a data element at the pivot position has the pivot value. Operation 808 includes determining, using the processor, whether data elements adjacent to the pivot position also have the pivot value. Operation 810 includes, based on at least determining that data elements adjacent to the pivot position also have the pivot value, adjusting a partition boundary to form a 3-way sorting arrangement of less than the pivot value, equal to the pivot value, and greater than the pivot value. Operation 812 includes sorting, using the processor, the data set using the pivot value and the adjusted partition boundary.

Additional Examples

An example system comprises: a processor; and a computer storage medium storing instructions that are operative upon execution by the processor to: retrieve, from the computer storage medium, a data set; sample, by the processor, the data set with a sampling vector set, the sampling vector set comprising at least one vector, each vector comprising a plurality of data elements of the data set; determine, using a vector instruction executed by the processor, a median value of the data elements in the sampling vector set; determine, using the processor, whether multiple data elements in the sampling vector set have a same value as the median value or are already sorted; based on at least determining that the data elements in the sampling vector set have the same value as the median value or are already sorted, identify that at least a portion of the data set is to be excluded from at least a portion of sorting operations; and sort, using the processor, the data set using the median value as a pivot value, wherein the sorting excludes, from at least the portion of sorting operations, any portion of the data set identified as to be excluded.

An example computerized method comprises: retrieving, from a computer storage medium, a data set; sampling, by a processor, the data set with a sampling vector set, the sampling vector set comprising at least one vector, each vector comprising a plurality of data elements of the data set; determining, using a vector instruction executed by the processor, a median value of the data elements in the sampling vector set; determining, using the processor, whether multiple data elements in the sampling vector set have a same value as the median value or are already sorted; based on at least determining that the data elements in the sampling vector set have the same value as the median value or are already sorted, identifying that at least a portion of the data set is to be excluded from at least a portion of sorting operations; and sorting, using the processor, the data set using the median value as a pivot value, wherein the sorting excludes, from at least the portion of sorting operations, any portion of the data set identified as to be excluded.

One or more example computer storage devices has computer-executable instructions stored thereon, which, upon execution by a computer, cause the computer to perform operations comprising: retrieving, from a computer storage medium, a data set; sampling, by a processor, the data set with a sampling vector set, the sampling vector set comprising at least one vector, each vector comprising a plurality of data elements of the data set; determining, using a vector instruction executed by the processor, a median value of the data elements in the sampling vector set; determining, using the processor, whether multiple data elements in the sampling vector set have a same value as the median value or are already sorted; based on at least determining that the data elements in the sampling vector set have the same value as the median value or are already sorted, identifying that at least a portion of the data set is to be excluded from at least a portion of sorting operations; and sorting, using the processor, the data set using the median value as a pivot value, wherein the sorting excludes, from at least the portion of sorting operations, any portion of the data set identified as to be excluded.

Another example computerized method comprises: determining a microarchitecture version of a computing device; based on at least the microarchitecture version, selecting a dynamic library implementation of sorting instructions from a plurality of dynamic library implementations of sorting instructions, wherein the dynamic library implementation of sorting instructions comprises vector instructions; retrieving, from a computer storage medium, a data set; and sorting, using a processor of the computing device, wherein sorting the data set comprises sorting the data set using the selected dynamic library implementation of sorting instructions.

Another example computerized method comprises: retrieving, from a computer storage medium, a data set; determining, using a processor, a pivot value for the data set; determining, using the processor, a pivot position within the data set, wherein a data element at the pivot position has the pivot value; determining, using the processor, whether data elements adjacent to the pivot position also have the pivot value; based on at least determining that data elements adjacent to the pivot position also have the pivot value, adjusting a partition boundary to form a 3-way sorting arrangement of less than the pivot value, equal to the pivot value, and greater than the pivot value; and sorting, using the processor, the data set using the pivot value and the adjusted partition boundary.

Alternatively, or in addition to the other examples described herein, examples include any combination of the following:

the sampling vector set comprises at least four vectors;
determining the median value comprises determining the median value from an odd-numbered subset of the sampling vector set, less than a total number of data elements in the sampling vector set;
determining whether multiple data elements in the sampling vector set are already sorted comprises determining whether data elements are pairwise sorted across vectors;
determining, using the processor, a pivot value for the data set;
determining a pivot position within the data set;
determining, using the processor, a pivot position within the data set;
the data element at the pivot position has the pivot value;
determining whether data elements adjacent to the pivot position also have the pivot value;
determining, using the processor, whether data elements adjacent to the pivot position also have the pivot value;

based on at least determining that data elements adjacent to the pivot position also have the pivot value, adjusting a partition boundary to form a 3-way sorting arrangement of less than the pivot value, equal to the pivot value, and greater than the pivot value;

determining a microarchitecture version of a computing device executing the sorting;

based on at least the microarchitecture version, selecting a dynamic library implementation of sorting instructions from a plurality of dynamic library implementations of sorting instructions;

sorting the data set comprises sorting the data set using the selected dynamic library implementation of sorting instructions;

determining, based on a pattern of memory reads, an upcoming memory location to read;

prefetching a data element from the upcoming memory location to read;

the computer storage medium is located in a cloud computing node;

the data set comprises a database located on a remote node from a user;

sorting, using the processor, the data set using the pivot value and the adjusted partition boundary;

determining whether multiple data elements in the sampling vector set are already sorted comprises determining whether data elements are pairwise sorted across vectors using a vector instruction;

sorting the data set comprises sorting the data set using vector instructions;

the dynamic library implementation of sorting instructions comprises vector instructions;

the vector instructions comprise AVX vector instructions;

the vector instructions comprise AVX-512 vector instructions;

determining the microarchitecture version comprises determining a processor identifier;

determining the microarchitecture version comprises determining a motherboard configuration;

determining the microarchitecture version comprises determining a memory cache configuration;

determining the microarchitecture version comprises determining an OS configuration;

each dynamic library implementation of sorting instruction is tuned to a selected one of a plurality of microarchitecture versions;

for each microarchitecture version of a plurality of microarchitecture versions, compiling an architecture-specific dynamic library implementation;

compiling the architecture-specific dynamic library implementation comprises adjusting the dynamic library implementation for a count of vector registers available in the microarchitecture version;

determining a risk factor for an overheating clock penalty on a microarchitecture version;

the risk factor for the overheating clock penalty indicates an estimate of the vector instruction workload;

based on an expected performance improvement with vector instructions relative to an overheating clock penalty, selecting between a plurality of sorting instruction implementations, in which one implementation provides a lower risk of incurring the overheating clock penalty;

deploying, to a computing device, a plurality of dynamic library implementations of sorting instructions;

deploying, to a first computing device, a first dynamic library implementation tuned to a microarchitecture version of the first computing device;

deploying, to a second computing device, a second dynamic library implementation tuned to a microarchitecture version of the second computing device;

the second dynamic library implementation is different than the first dynamic library implementation;

determining a runtime for sorting the data set on a first microarchitecture version;

determining a runtime for sorting the data set on a second microarchitecture version;

based on at least the runtime for sorting the data set on the first microarchitecture version and the runtime for sorting the data set on the second microarchitecture version, generating a report indicating a performance comparison of vector instructions on the second microarchitecture version relative to vector instructions on the first microarchitecture version;

setting a page size; and tuning a stack to avoid overflow.

While the aspects of the disclosure have been described in terms of various examples with their associated operations, a person skilled in the art would appreciate that a combination of operations from any number of different examples is also within scope of the aspects of the disclosure.

Example Operating Environment

Figure 9:
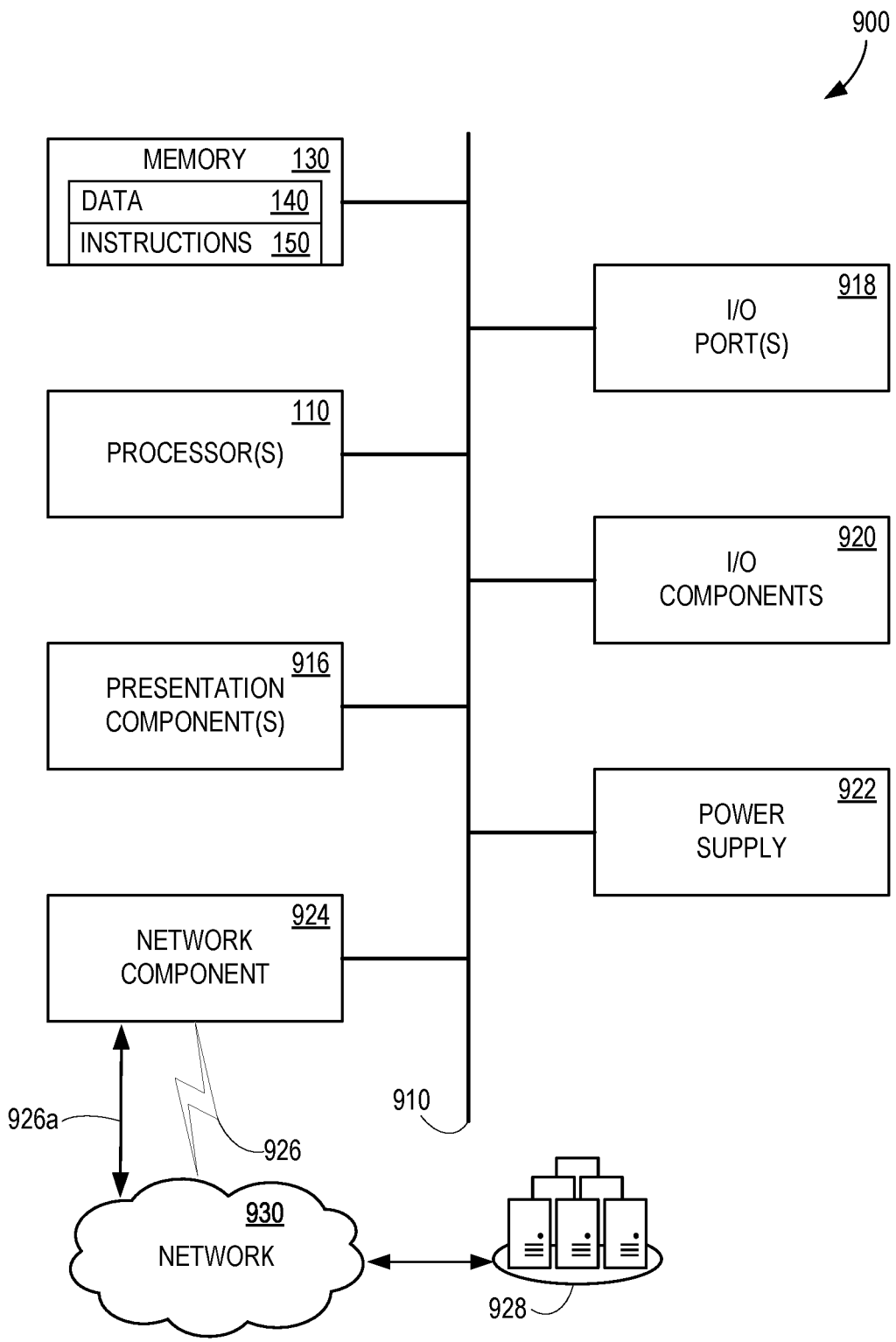
FIG. 9 is a block diagram of an example computing environment suitable for implementing some of the various examples disclosed herein.

FIG. 9 is a block diagram of an example computing device 900 for implementing aspects disclosed herein, and is designated generally as computing device 900. In some examples, one or more computing devices 900 are provided for an on-premises computing solution. In some examples, one or more computing devices 900 are provided as a cloud computing solution. In some examples, a combination of on-premises and cloud computing solutions are used. Computing device 900 is but one example of a suitable computing environment and is not intended to suggest any limitation as to the scope of use or functionality of the examples disclosed herein, whether used singly or as part of a larger set.

Neither should computing device 900 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 900 includes a bus 910 that directly or indirectly couples the following devices: memory 130, one or more processors 110, one or more presentation components 916, input/output (I/O) ports 918, I/O components 920, a power supply 922, and a network component 924. While computing device 900 is depicted as a seemingly single device, multiple computing devices 900 may work together and share the depicted device resources. For example, memory 130 may be distributed across multiple devices, and processor(s) 110 may be housed with different devices.

Bus 910 represents what may be one or more busses (such as an address bus, data bus, or a combination thereof). Although the various blocks of FIG. 9 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." Memory 130 may take the form of the computer storage media referenced below and operatively provide storage of computer-readable instructions, data structures, program modules and other data for computing device 900. In some examples, memory 130 stores one or more of an operating system, a universal application platform, or other program modules and program data. Memory 130 is thus able to store and access data 140 and instructions 150 that are executable by processor 110 and configured to carry out the various operations disclosed herein.

In some examples, memory 130 includes computer storage media. Memory 130 may include any quantity of memory associated with or accessible by computing device 900. Memory 130 may be internal to computing device 900 (as shown in FIG. 9), external to computing device 900 (not shown), or both (not shown). Additionally, or alternatively, memory 130 may be distributed across multiple computing devices 900, for example, in a virtualized environment in which instruction processing is carried out on multiple computing devices 900. For the purposes of this disclosure, "computer storage media," "computer-storage memory," "memory," "computer storage devices", and "memory devices" are synonymous terms for memory 130, and none of these terms include carrier waves or propagating signaling.

Processor(s) 110 may include any quantity of processing units that read data from various entities, such as memory 130 or I/O components 920. Specifically, processor(s) 110 are programmed to execute computer-executable instructions for implementing aspects of the disclosure. The instructions may be performed by the processor, by multiple processors within computing device 900, or by a processor external to the client computing device 900. In some examples, the processor(s) 110 are programmed to execute instructions such as those illustrated in the flow charts discussed below and depicted in the accompanying drawings. Moreover, in some examples, the processor(s) 110 represent an implementation of analog techniques to perform the operations described herein. For example, the operations may be performed by an analog client computing device 900 and/or a digital client computing device 900. Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways. I/O ports 918 allow computing device 900 to be logically coupled to other devices including I/O components 920, some of which may be built in. Example I/O components 920 include, for example but without limitation, a microphone, joystick, game pad, satellite dish, scanner, printer, wireless device, etc.

Computing device 900 may operate in a networked environment via the network component 924 using logical connections to one or more remote computers. In some examples, the network component 924 includes a network interface card and/or computer-executable instructions (e.g., a driver) for operating the network interface card. Communication between computing device 900 and other devices may occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 924 communicates over wireless communication link 926 and/or a wired communication link 926a to a remote resource 928 (e.g., a cloud resource) across network 930. Various different examples of communication links 926 and 926a include a wireless connection, a wired connection, and/or a dedicated link, and in some examples, at least a portion is routed through the internet.

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer-readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer-readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a computer storage medium storing instructions that are operative upon execution by the processor to:
   sample, by the processor, a data set with a sampling vector set, the sampling vector set comprising at least one vector, each vector comprising a plurality of data elements of the data set;
   determine, using a vector instruction executed by the processor, a median value of the data elements in the sampling vector set;
   determine, using the processor, that multiple data elements in the sampling vector set have a same value as the median value or are already sorted;
   identify that at least a portion of the data set is to be excluded from at least a portion of sorting operations; and
   sort, using the processor, the data set using the median value as a pivot value, wherein the sorting excludes, from the at least a portion of sorting operations, the at least a portion of the data set identified as to be excluded.

2. The system of claim 1, wherein the sampling vector set comprises at least four vectors.

3. The system of claim 1, wherein determining the median value comprises determining the median value from an odd-numbered subset of the sampling vector set, less than a total number of data elements in the sampling vector set.

4. The system of claim 1, wherein determining that multiple data elements in the sampling vector set are already sorted comprises determining that data elements are pairwise sorted across vectors.

5. The system of claim 1, wherein the instructions are further operative to:
   determine a pivot position within the data set, wherein a data element at the pivot position has the pivot value;
   determine that data elements adjacent to the pivot position also have the pivot value; and
   adjust a partition boundary to form a 3-way sorting arrangement of less than the pivot value, equal to the pivot value, and greater than the pivot value.

6. The system of claim 1, wherein the instructions are further operative to:
   determine a microarchitecture version of a computing device executing the sorting; and
   based on at least the microarchitecture version, select a dynamic library implementation of sorting instructions from a plurality of dynamic library implementations of sorting instructions, wherein sorting the data set comprises sorting the data set using the selected dynamic library implementation of sorting instructions.

7. The system of claim 1, wherein the instructions are further operative to:
   determine, based on a pattern of memory reads, an upcoming memory location to read; and
   prefetch a data element from the upcoming memory location to read.

8. A computerized method comprising:
   sampling, by a processor, a data set with a sampling vector set, the sampling vector set comprising at least one vector, each vector comprising a plurality of data elements of the data set;
   determining, using a vector instruction executed by the processor, a median value of the data elements in the sampling vector set;
   determining, using the processor, that multiple data elements in the sampling vector set have a same value as the median value or are already sorted;
   identifying that at least a portion of the data set is to be excluded from at least a portion of sorting operations; and
   sorting, using the processor, the data set using the median value as a pivot value, wherein the sorting excludes, from the at least a portion of sorting operations, the at least a portion of the data set identified as to be excluded.

9. The method of claim 8, wherein the sampling vector set comprises at least four vectors.

10. The method of claim 8, wherein determining the median value comprises determining the median value from an odd-numbered subset of the sampling vector set, less than a total number of data elements in the sampling vector set.

11. The method of claim 8, wherein determining that multiple data elements in the sampling vector set are already sorted comprises determining that data elements are pairwise sorted across vectors.

12. The method of claim 8, further comprising:
determining a pivot position within the data set, wherein a data element at the pivot position has the pivot value;
determining that data elements adjacent to the pivot position also have the pivot value; and
adjusting a partition boundary to form a 3-way sorting arrangement of less than the pivot value, equal to the pivot value, and greater than the pivot value.

13. The method of claim 8, further comprising:
determining a microarchitecture version of a computing device executing the sorting; and
based on at least the microarchitecture version, selecting a dynamic library implementation of sorting instructions from a plurality of dynamic library implementations of sorting instructions, wherein sorting the data set comprises sorting the data set using the selected dynamic library implementation of sorting instructions.

14. The method of claim 8, further comprising:
determining, based on a pattern of memory reads, an upcoming memory location to read; and
prefetching a data element from the upcoming memory location to read.

15. One or more computer storage media devices having computer-executable instructions stored thereon, which, upon execution by a computer, cause the computer to perform operations comprising:
sampling, by a processor, a data set with a sampling vector set, the sampling vector set comprising at least one vector, each vector comprising a plurality of data elements of the data set;
determining, using a vector instruction executed by the processor, a median value of the data elements in the sampling vector set;
determining, using the processor, that multiple data elements in the sampling vector set have a same value as the median value or are already sorted;
identifying at least a portion of the data set to be excluded from at least a portion of sorting operations; and
sorting, using the processor, the data set using the median value as a pivot value, wherein the sorting excludes, from the at least a portion of sorting operations, the at least a portion of the data set identified as to be excluded.

16. The one or more computer storage media of claim 15, wherein the sampling vector set comprises at least four vectors.

17. The one or more computer storage media of claim 15, wherein determining the median value comprises determining the median value from an odd-numbered subset of the sampling vector set, less than a total number of data elements in the sampling vector set.

18. The one or more computer storage media of claim 15, wherein determining that multiple data elements in the sampling vector set are already sorted comprises determining that data elements are pairwise sorted across vectors.

19. The one or more computer storage media of claim 15, wherein the operations further comprise:
determining a pivot position within the data set, wherein a data element at the pivot position has the pivot value;
determining that data elements adjacent to the pivot position also have the pivot value; and
adjusting a partition boundary to form a 3-way sorting arrangement of less than the pivot value, equal to the pivot value, and greater than the pivot value.

20. The one or more computer storage media of claim 15, wherein the operations further comprise:
determining a microarchitecture version of a computing device executing the sorting; and
based on at least the microarchitecture version, selecting a dynamic library implementation of sorting instructions from a plurality of dynamic library implementations of sorting instructions, wherein sorting the data set comprises sorting the data set using the selected dynamic library implementation of sorting instructions.

\* \* \* \* \*